US005747915A

United States Patent [19]
Benavides

[11] Patent Number: 5,747,915
[45] Date of Patent: May 5, 1998

[54] BENT SHAFT MOTOR

[75] Inventor: Gilbert L. Benavides, Albuquerque, N. Mex.

[73] Assignee: Sandia Corporation, Albuquerque, N. Mex.

[21] Appl. No.: 699,279

[22] Filed: Aug. 19, 1996

[51] Int. Cl.$^6$ .................................................. H01L 41/08
[52] U.S. Cl. .......................... 310/331; 310/306; 310/328; 310/82
[58] Field of Search ........................ 310/82, 306, 307, 310/309, 323, 328, 330–331

[56] References Cited

U.S. PATENT DOCUMENTS

| | | | |
|---|---|---|---|
| 2,275,827 | 3/1942 | Plensler | 310/82 |
| 2,439,499 | 4/1948 | Williams et al. | 310/331 |
| 3,294,994 | 12/1966 | Anderson | 310/82 |
| 3,928,778 | 12/1975 | Ivanov et al. | 310/331 |
| 4,622,483 | 11/1986 | Staufenberg, Jr. et al. | 310/328 |
| 4,727,278 | 2/1988 | Staufenberg, Jr. et al. | 310/328 |
| 5,144,187 | 9/1992 | Culp | 310/328 |
| 5,252,870 | 10/1993 | Jacobsen et al. | 310/82 |
| 5,327,038 | 7/1994 | Culp | 310/306 |
| 5,338,997 | 8/1994 | Benecke | 310/307 |
| 5,548,176 | 8/1996 | Oda | 310/328 |

FOREIGN PATENT DOCUMENTS

| | | | |
|---|---|---|---|
| 2-0155782 | 7/1987 | Japan | 310/323 |
| 227019 | 8/1943 | Sweden | 310/82 |

*Primary Examiner*—Mark O. Budd
*Attorney, Agent, or Firm*—George H. Libman

[57] ABSTRACT

A nonelectromagnetic motor comprising a base, a bent shaft which is rotable relative to the base wherein the bent shaft comprises a straight portion aligned with a main axis and an offset portion that is offset with respect to the main axis; and a drive means for driving the offset portion of the bent shaft along a generally circular path in a plane perpendicular to the main axis to rotate the bent shaft. The bent shaft and drive means for driving the bent shaft can be selected from piezoelectric, magnetostrictive, rheological and shape memory alloys. The drive means of the nonelectromagnetic motor can additionally comprise a shell which shell surrounds and houses the bent shaft and precesses or gyrates which in turn causes the bent drive shaft to rotate. The nonelectromagnetic motor does not rely on friction for the application of torque upon a rotor.

19 Claims, 8 Drawing Sheets

BENT SHAFT MOTOR

GOVERNMENT RIGHTS

This invention was made with United States Government support under Contract No. DE-AC04-76DP00789 awarded by the U.S. Department of Energy. The Government has certain rights in this invention.

BACKGROUND OF THE INVENTION

This invention relates to a nonelectromagnetic motor and, more particularly, to a motor having a bent shaft and torque generating means selected from piezoelectric, magnetostrictive, rheological, bimetallic strips and shape memory alloys.

Since the nineteenth century, electromagnetic motors have relied on interactions between electric currents and magnetic fields. These electromagnetic motors are well known and include slip rings, brushes and commutators that transmit power between fixed and rotating structures. Sliding contact of slip rings in particular restricts the lower limit of contact resistance, and rough or harsh contacts cause high frequency resistance fluctuations that result in the generation of heat, electrical noise and electromagnetic interference which can initiate an explosion in a combustible environment. The conduction of even moderate currents through sliding contacts repeatedly welds and breaks the contacts, causing a continual rearrangement of conducting material of the sliding contacts. As a result, contact surfaces become rougher with continued use. Brushes, which have a relatively small contact surface area, generally wear out faster than rings. These characteristics of resistance fluctuations, contact welding, electromagnetic interference and short lifetime of motor parts make conventional electromagnetic motors unsatisfactory in many applications and environments. Other problems associated with conventional electromagnetic motors include low power densities and the difficulty to transfer motion through a hermetic barrier. Conventional electromagnetic motors also produce electromagnetic interference with devices that are sensitive to electromagnetic fields such as those associated with magnetic resonance imaging, and super colliders, and certain space applications. In addition, the shape of conventional electromagnetic motors poses difficult packaging problems associated with devices such as those related to medical and dental applications. Also, conventional electromagnetic motors are often not explosion proof in combustible environments.

The limitations of electromagnetic motors in environments such as outer space or in small confined spaces has led to the investigation of alternative types of transducers, actuators, and motors. As an alternative to electromagnetic motors, engineers have turned to piezoelectric technology to develop motors without windings that do not use a magnetic field to develop a rotational torque but, instead, are driven by the expansion and contraction of material such as piezoelectric elements to which an electric potential is applied. Commercially developed piezoelectrically driven motors provide an alternative means of producing rotary motion.

A multitude of designs for piezoelectric motors currently exist. U.S. Pat. No. 5,144,187 describes a motor which uses a plurality of radially acting piezoelectric actuators to import rotation to a motor shaft having surface undulations. U.S. Pat. No. 4,622,483 discloses an electromechanical translation apparatus which is adapted to produce incremental movement relative to a separate member wherein that movement can either be a linear movement or a rotational movement. The electromechanical translation apparatus disclosed in U.S. Pat. No. 4,622,483 includes a housing, a pair of clamping and translating members each of which has driven end and engaging ends wherein each of the engaging ends is adapted to removably clamp and translate separate member relative the housing in response to a driving force which is selectively applied to the clamping and translating members. The engaging ends of the clamping and translating members selectively clamp the separate member at selected locations with a clamping force developed from a compliance means and which varies with the magnitude of the driving force. The electromechanical translation apparatus disclosed in U.S. Pat. No. 4,622,483 includes at least one piezoelectric driving element which is operatively coupled to the clamping and translating member. The piezoelectric driving element is capable of being selectively expanded and contracted in a response to a voltage of a selected magnitude and selected frequency. The expansion and contraction of the piezoelectric element produces a variable driving force which varies between a first magnitude and a second magnitude and which enables the engaging ends of the clamping and translating members to apply a variable clamping force to the separate member. A method for producing relative transactional movement between an electromechanical apparatus and a separate member is also disclosed in U.S. Pat. No. 4,622,483.

U.S. Pat. No. 4,727,278 discloses an electromechanical translation apparatus in the form of a piezoelectric multiaxis micropositioner. The apparatus disclosed in U.S. Pat. No. 4,727,278 includes a driven member which is adapted to incrementally move in a selected direction, which could be along an "X" axis, along an "XY" axis or "XYZ" axis or in a selected clockwise or counter clockwise direction about a selected axis. The piezoelectric multiaxis micropositioner includes a mounting means, at least three piezoelectric driving assemblies having a housing and an engaging member formed of a hard material having a selected driving end at one end thereof and a driven end at the other end. The engaging member at one end is positioned to selectively engage and translate the driven member in response to a driving force. The piezoelectric multiaxis positioner includes at least three piezoelectric driving elements positioned between a driven end of the engaging member and the housing and wherein the piezoelectric driving elements are positioned in a spaced, angular relationship to each other. Each piezoelectric driving element is capable of separately responding to an electrical signal having a predetermined frequency and amplitude which varies between first polarity and a second polarity to expand and contract to change the geometric dimension of the piezoelectric driving element to apply a driving force on an engaging member. The engaging member imparts an incremental motion to the driven member in a selected direction. The piezoelectric multi-axis positioner disclosed in U.S. Pat. No. 4,727,278, incrementally rotates a sphere having an optical element attached thereto for use in optical paths.

The present invention represents an advance over existing technology for nonelectromagnetic motors by employing a bent shaft motor configuration. The unique application of piezoelectric, magnetostrictive, and rheological materials as well as shape-memory alloy as the torque generating element of the bent shaft motor make this invention an advance over existing technology. Current electromagnetic motors rely upon frictional drives. The present invention instead uses a somewhat cylindrical shell that rotates the bent shaft, and as a consequence eliminates the friction and heat associated with existing electromagnetic motor technologies. The present invention utilizes a resonant frequency of a generally cylindrical structure to rotate the bent shaft motor, which results in a less expensive motor and one which is easier to fabricate than existing motor technologies.

As with other piezoelectric resonant motors, the present invention possesses a higher power density than available in current electromagnetic motors. Also, the bent shaft motor of the present invention can be easily hermetically sealed, unlike existing motor technologies. The cylindrical shell of the present invention can, for example, be capped at one end to form a hermetic barrier. The present invention does not create electromagnetic interference with devices that are sensitive to electromagnetic fields, nor is it sensitive to external electromagnetic fields such as those associated with magnetic resonance imaging and super colliders. The bent shaft motor disclosed by the present invention also possesses a slender shape that allows it to solve difficult packaging problems associated with devices such as those related to medical and dental applications.

SUMMARY OF THE INVENTION

The bent shaft motor of the present invention comprises a base and a drive shaft which is rotable relative to the base. The drive shaft comprises a straight portion aligned with a main axis and an offset portion that is offset with respect to the main axis; and a drive means for driving the offset portion of the drive shaft along a generally circular path in a plane perpendicular to the main axis in order to rotate the drive shaft.

A shell can surround and house the drive shaft and flex rather than rotate. The drive shaft comprises the form of a bent shaft. The shell precesses or gyrates which in turn causes the shaft to rotate. The shell may take various forms, including the form of a bent cylinder or bellows as in a resonant motor, a bender as in a stepper motor, or a structure comprising shape-memory alloy material. The shell may be cylindrical in shape or contour, but can take other shapes and forms as well. The size of the bent shaft motor may range from a microscopic to a macroscopic scale, depending upon the application of the motor. Such a motor can replace current motors utilized in automotive accessories, watches, household items, medical devices and so forth.

Further scope of applicability of the present invention will become apparent from the detailed description of the invention provided hereinafter. It should be understood, however, that the detailed description of the invention and the specific examples presented, while indicating embodiments of the present invention, are provided for illustration purposes only because various changes and modifications within the spirit and scope of the invention will become apparent to those of ordinary skill in the art from the detailed description of the invention and claims that follow.

DETAILED DESCRIPTION OF THE INVENTION

Figure 1:
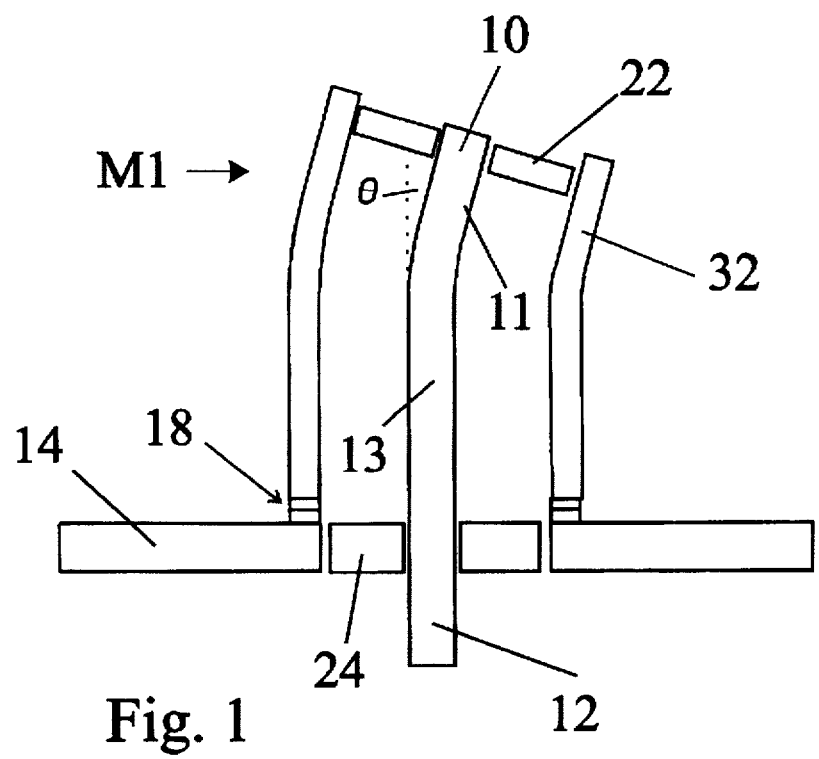
FIG. 1 is a side sectional view of a bent shaft resonant motor with a segmented piezoelectric assembly.

The bent shaft motor of the present invention comprises a compliant drive means, a base plate, a bent shaft and a torque generating means for rotating the bent shaft. Referring to FIG. 1, a first embodiment of the nonelectromagnetic motor comprises a resonant motor M1 having drive means for surrounding an offset portion of the bent shaft. The drive means in FIG. 1 is a flexible shell 32 which surrounds and supports rigid bent shaft 10. The bent shaft 10 is formed so as to include a portion 11 at an angle θ to the longitudinal axis of the remaining portion 13 of the rigid bent shaft 10. Shell 32 is contoured longitudinally to conform to angle θ such that the portion 11 and remaining portion 13 of the rigid bent shaft 10 are aligned with the central longitudinal axis of shell 32. As will be explained in more detail later, shell 32 can be made to generate torque by gyrating or precessing in order to cause bent shaft 10 to rotate.

The resonant motor M1 further includes a base plate 14 having an opening in which a lower bearing 24 is mounted. A portion 12 of rigid bent shaft 10 extends through lower bearing 24 beyond one end of shell 32 and base plate 14 and can be used as an output shaft to drive a given load.

A piezoelectric assembly 18 for causing rigid bent shaft 10 to rotate, surrounds the opening for lower bearing 24 between shell 32 and base plate 14. Piezoelectric assembly 18 preferably includes at least two stacked segmented piezoelectric sections, 18a and 18b. Each section contains a plurality of polarized piezoelectric elements (+,–) to produce traveling waves, either clockwise or counterclockwise, as described hereinafter.

One end of shell 32 is adjacent assembly 18 and the other end is connected to bent portion 11 of shaft 10 by an upper bearing 22. Shell 32 may be an flexible, resonant structure, and preferably is formed from a metal bellows.

Figure 2:
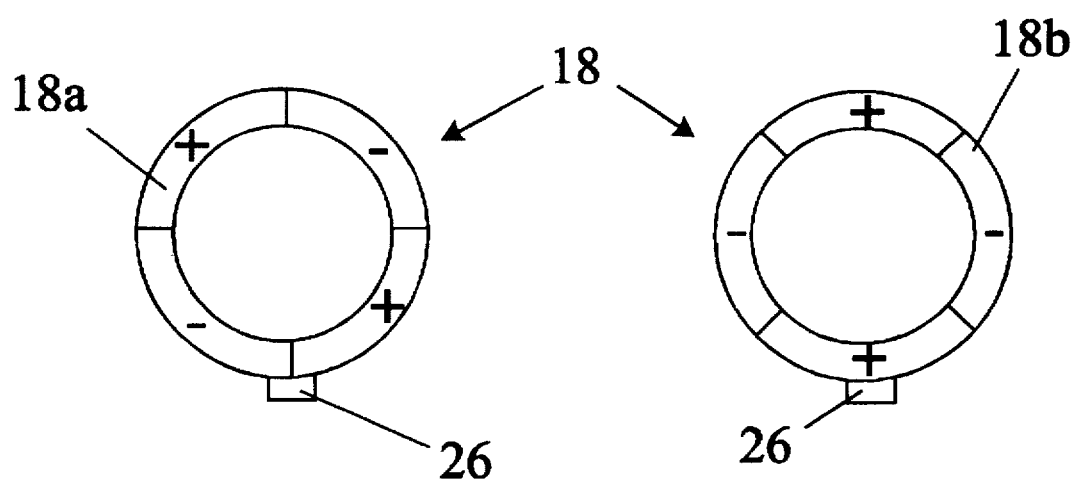
FIG. 2 is a plan view of segmented piezoelectric sections that comprise the piezoelectric assembly.

FIG. 2 shows a plan view of a preferred embodiment of piezoelectric assembly 18 to include two piezoelectric sections 18a and 18b. As is conventional for such assemblies, each section is energized by an alternating electrical signal applied to electrodes (not shown) that sandwich each assembly. The piezoelectric assembly 18 acts as an exciter assembly to excite a resonant frequency of the resonant motor M1. The piezoelectric sections 18a and 18b are stacked and oriented such that tabs 26 are aligned, whereby the offset polarities of the two assemblies enables the direction of rotation to be controlled. The piezoelectric assembly 18 is energized with alternating electrical currents so as to create a traveling wave, in either the clockwise or counterclockwise direction about the axis of rotation. However, a single piezoelectric element can also suffice to excite the resonant frequency of the shell 32 thereby producing rotation.

The details of such piezoelectric assemblies are well known in the art (See, for example "Ultrasonic Motor", Panasonic Technical Reference, Matsushita Electric Industrial Co. 1987.) The bent shaft and associated shell structure comprise the novel features of the invention.

When the piezoelectric assembly 18 is energized, the compliant shell 32 resonates and precesses about the axis of rotation of the bent shaft 10 in a somewhat conical path. For a cylindrically shaped shell 32, the shell 32 is only truly cylindrical when separate from the bent shaft 10 and in an unrestrained position.

The resonant motor M1 does not rely on a frictional drive as in conventional motors. Rather, as shell 32 resonates, the bent shaft 10 can be rotated in a clockwise or counterclockwise direction. By eliminating the need for a sliding interface, the present invention eliminates the friction as well as the associated heat and wear resulting from such a sliding interface, thereby increasing the life and efficiency of the resonant motor M1.

Although this embodiment utilizes piezoelectric principals, piezoelectricity is not a necessary limitation of the present invention. Other methods for exciting the resonant frequency of the motor can be employed such as electromagnetic and magnetorestrictive force. Also, the exciter is not limited to the creation of travelling waves. A single mode exciter such as a bender element is sufficient.

Furthermore, a cylindrical shape is not a necessary limitation of shell 32 of the present invention. Other shapes can be utilized for the shell 32 as well. For example, the shell 32 can include the shape of a disk with a hole therethrough which is advantageous for packaging purposes. Shell 32 can also be comprised of one or more flat plates arranged about the periphery of the bent shaft much like the benders 28 illustrated in FIGS. 4(a) and 4(b).

Figure 3:
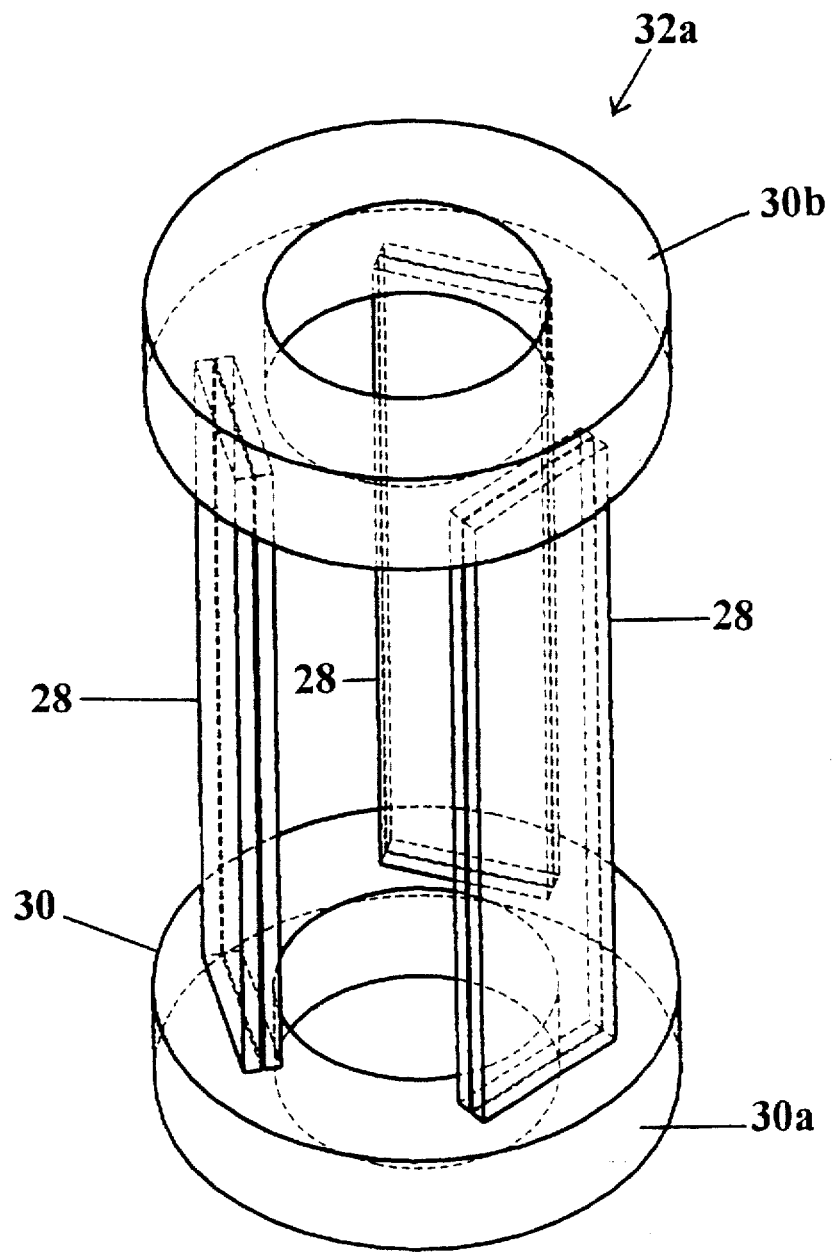
FIG. 3 is a side view of a bender assembly.
Figure 4:
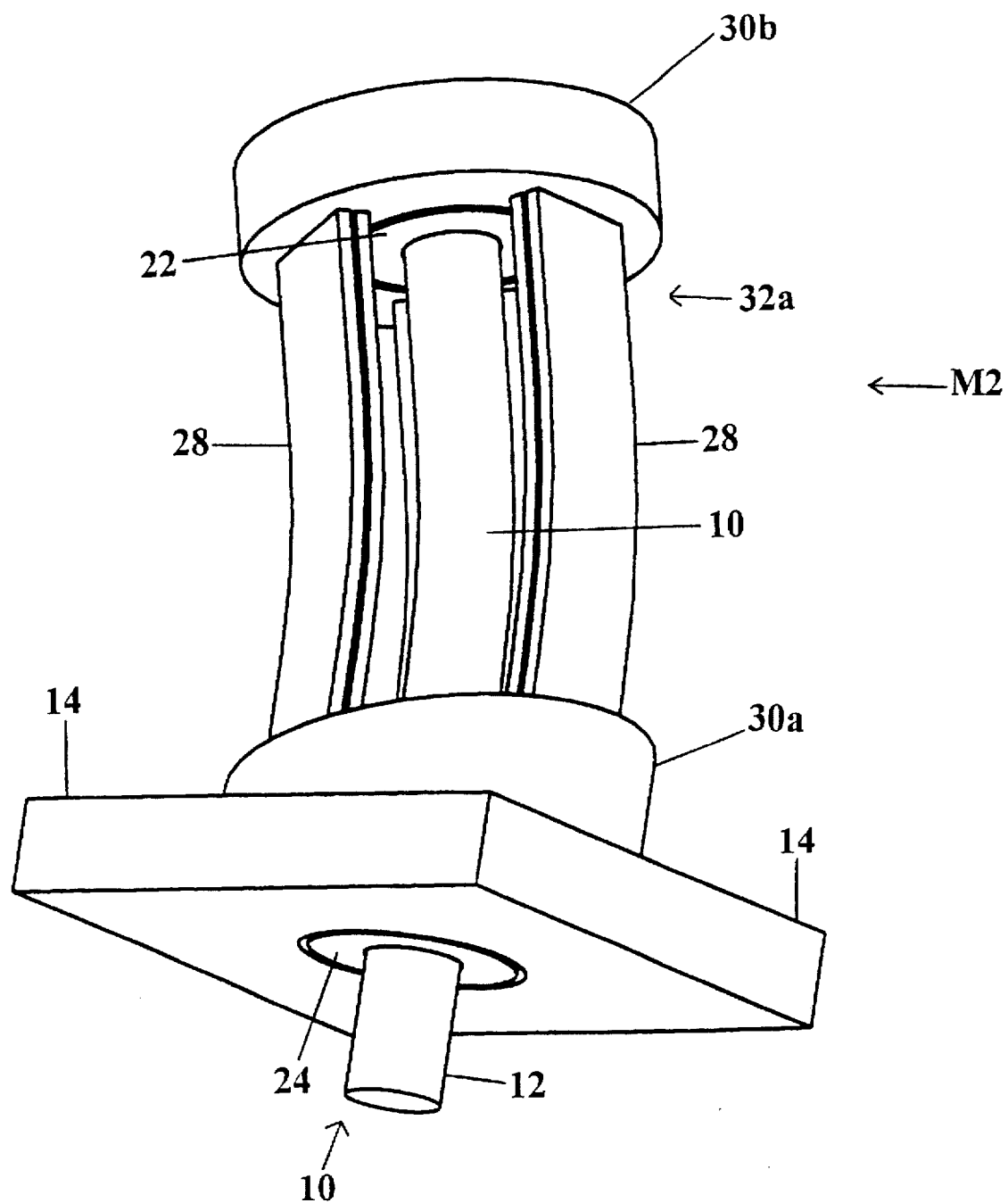
FIG. 4(a) is a side view of a bent shaft motor with a bender assembly.
FIG. 4(b) is a side view of a bent shaft motor with a bender assembly.
Figure 4:
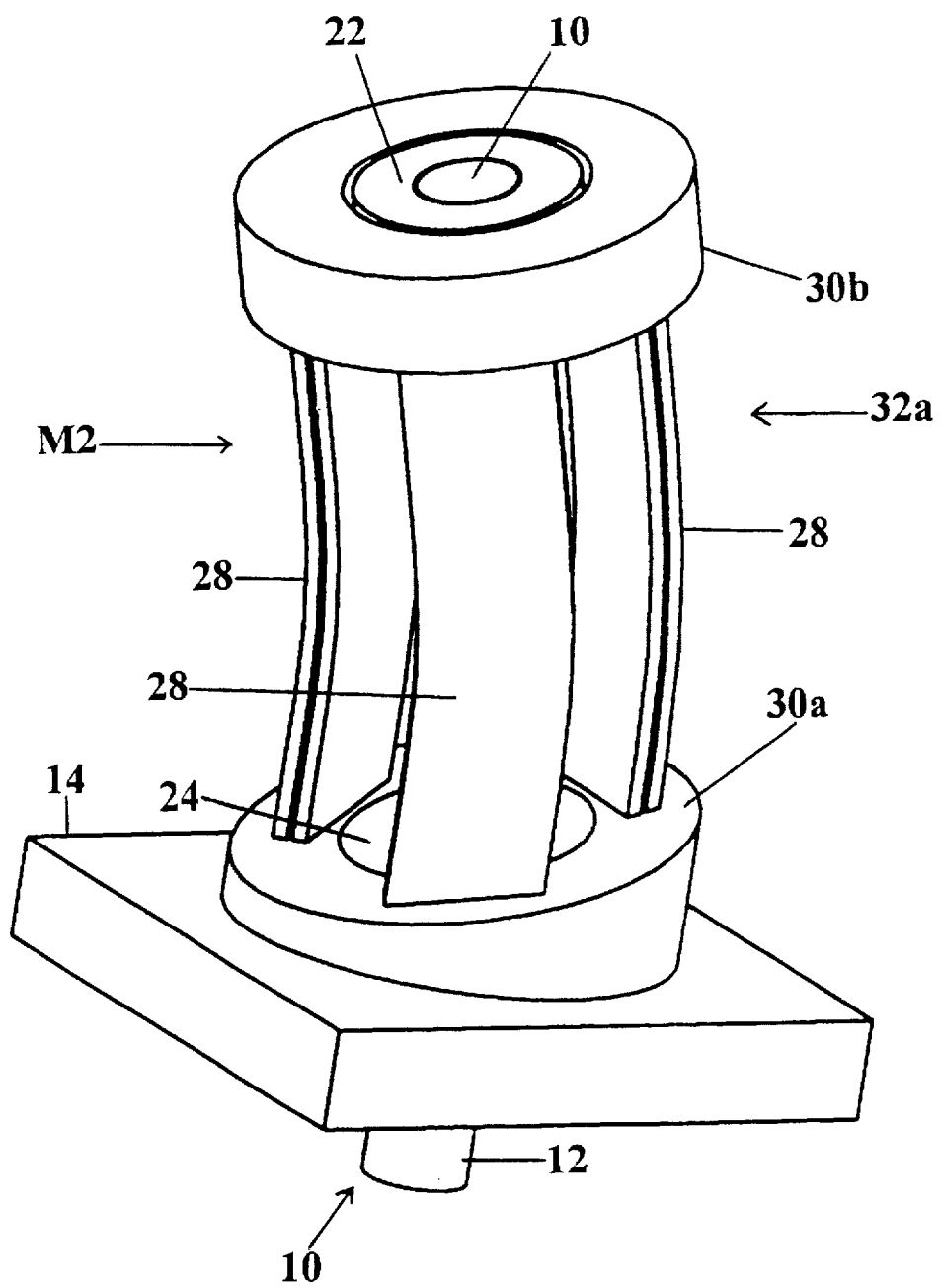

FIG. 3, FIG. 4(a) and FIG. 4(b) show a second embodiment of the present invention. FIG. 3 shows an embodiment of a shell which forms a bender assembly 32a to act as a torque means for the motor. The bender assembly 32a comprises a series of benders 28 which can be, for example, piezoelectric bimorphs. A bimorph is a planar device that bends in either direction which causes the bimorph to curl about an axis. Each bender 28 is attached to a respective upper ring 30a and lower ring 30b. Rings 30a and 30b expand or contract to accommodate the varying length of each bender 28 in the axial direction. Rings 30a and 30b can be compliant and produced from flexible materials such as elastomers.

FIG. 4(a) and FIG. 4(b) specifically shows different views of a bent shaft motor M2 which utilizes the bender assembly 32a of FIG. 3. The bender assembly 32a is attached to the bent shaft motor M2 by fixing ring 30a to the base plate 14 and by shaping the benders 28a–28c to conform to the shape of the bent shaft 10. The benders 28 are also connected to ring 30b, which connects to the bent end of bent shaft 10 through a bearing assembly 22. The straight portion 12 of shaft 10 passes through a lower bearing assembly (not shown) in the opening of fixing ring 30a.

In operation, voltages are applied to the benders 28 through a conventional switching circuit so that one bender 28a bends away from shaft 10 and the others simultaneously bend toward bent shaft 10. For the next cycle, applied voltages cause bender 28b to bend away from bent shaft 10 while 28a and 28c bend toward the shaft. For the third cycle, bender 28c bends away from bent shaft 10. This cyclical movement of ring 30b in a circle parallel to base plate 14 causes the bent portion of bent shaft 10 to rotate in response to the applied voltage.

Figure 5:
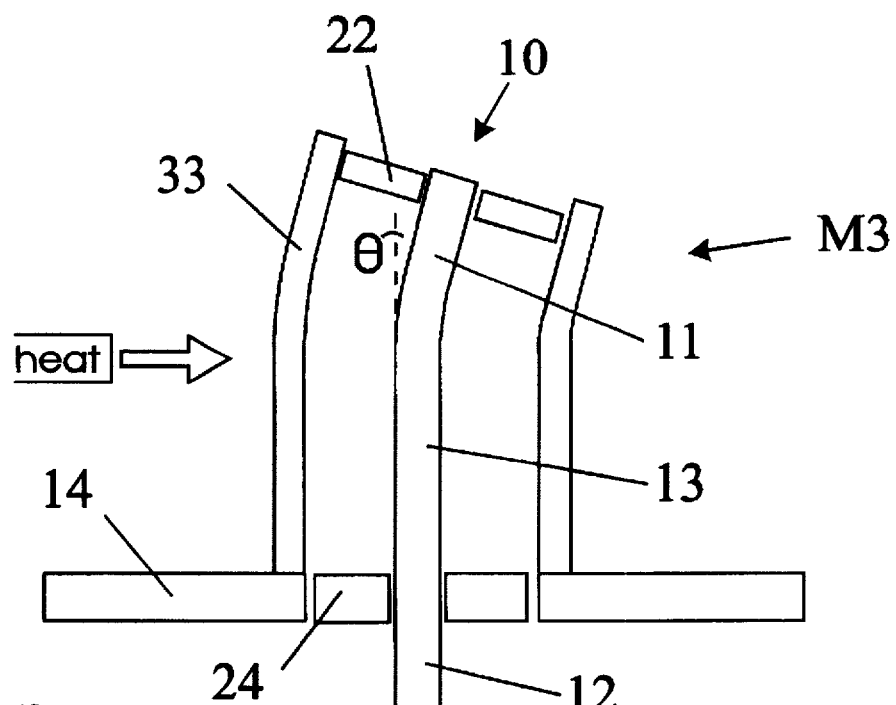
FIG. 5 is a side sectional view of a bent shaft motor with a shell comprising shape-memory-alloy material.

FIG. 5 shows a third embodiment of the present invention having a shell 33 comprised of shape-memory alloy material. Shape-memory alloy material is material that in the presence of heat returns to a preferred or unrestrained shape and position. A commutator (not shown) can be utilized to rotate the application of heat from a source 55 around shell 33. Such a commutator can be fixed on the bent shaft 10 and rotated to activate a localized area of the shape-memory alloy-material. The application of heat returns the localized area of shape-memory alloy-material to its unrestrained shape and, consequently, strains other areas of the shell 33. Solar energy can provide an optional heat source for the shape-memory alloy motor M3. This embodiment also includes an upper bearing 22 and a lower bearing 24 to allow relative rotation between shaft 10 and shell 33. An output shaft 12 formed from the bent shaft 10 can drive a given load as a base plate 14 supports the motor M3. In a modification to this embodiment, the lower bearing 24 and the base plate 14 can be combined to form one part (e.g. a journal bearing). Likewise, the upper bearing 22 can be combined with the bent shaft 10. Bent shaft 10 is formed in FIG. 5 so as to include a portion 11 at angle θ to the longitudinal axis of the remaining portion 13 of the bent shaft 10.

Figure 6:
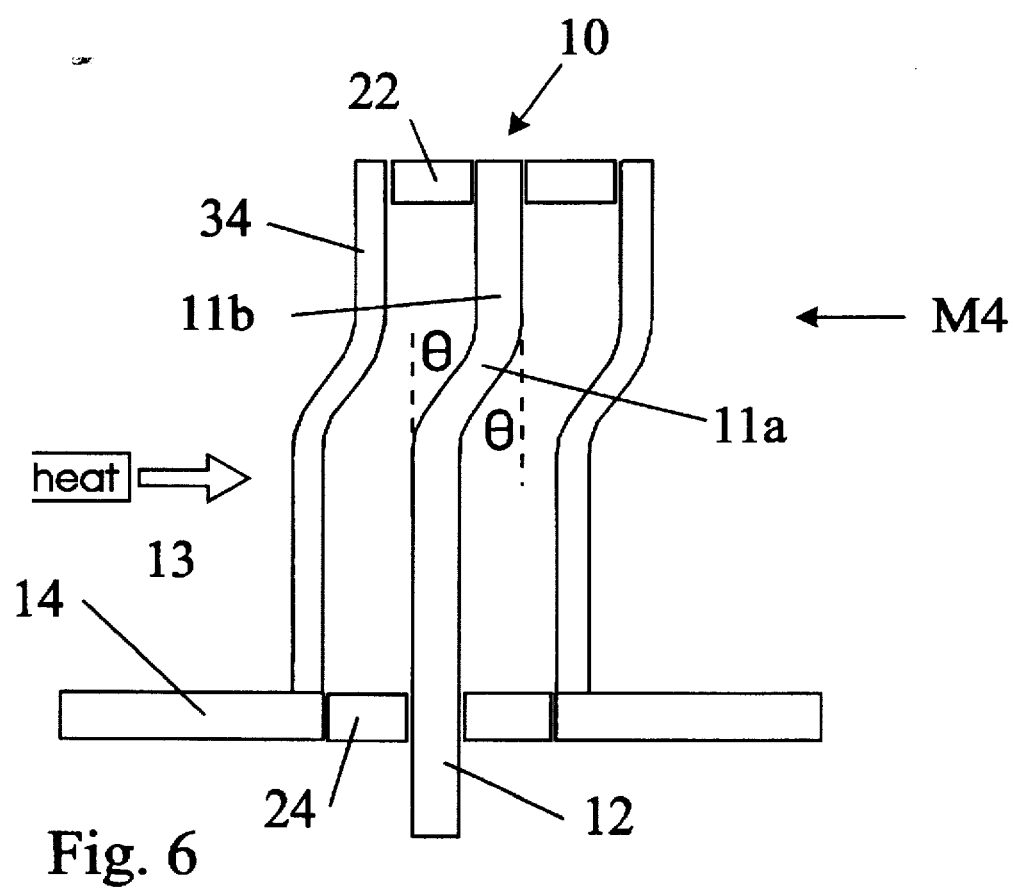
FIG. 6 is a side sectional view of a bent shaft motor with a shell comprising shape-memory-alloy material and having an offset bent shaft.

FIG. 6 illustrates a variation on the present invention where the extremities of the bent shaft 10 are parallel but offset. The bent shaft 10 is formed in FIG. 6 so as to include a portion 11a which is offset at an angle θ from portion 11b. The remaining portion 13 is offset also by an angle θ from portion 11a. The bent shaft 10 of FIG. 6 thus comprises three portions, 11a, 11b and 13.

The shell 34 of FIG. 6 is comprised of shape-memory-alloy material. The motor M4 has an upper bearing 22, a lower bearing 24, and a base plate 14. The output shaft 12 drives a load. The parallel but offset shaft 10 of FIG. 6 can also be applied to motors M1, M2 and M3 as well. Each embodiment of the present invention can posses such parallel but offset extremities.

Figure 7:
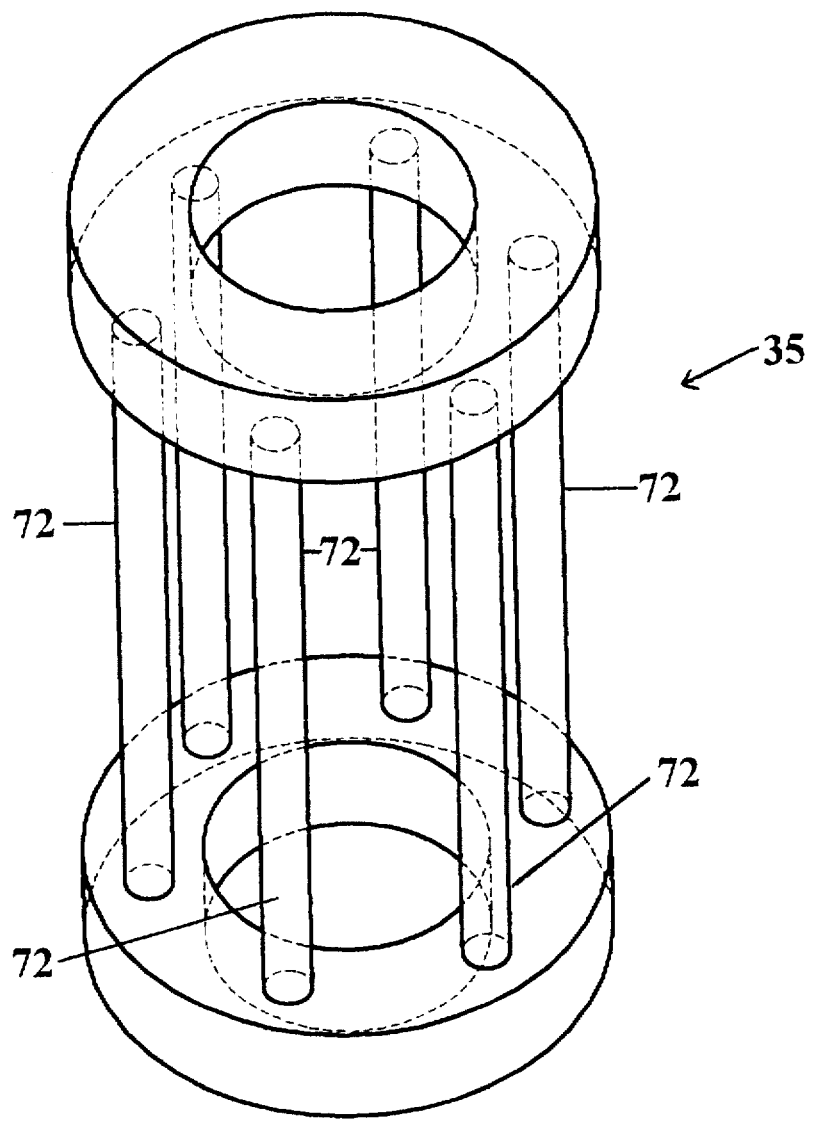
FIG. 7 is a view of a shell for a bent shaft motor composed of shape-memory-alloy wires.

FIG. 7 presents a variation of the embodiment of the motor M3 of FIG. 5 and motor M5 of FIG. 6 by illustrating a shell 35 comprising shape-memory-alloy wires. This shape-memory-alloy wire version responds to both direct heat and electrical activation. Applying heat in a prescribed sequence to individual wires 72 can cause the bent shaft 10 of motor M3 of FIG. 5 and motor M5 of FIG. 6 to rotate. Alternatively, each wire 72 can be electrically activated through resistive heating. Shell 35 can also be utilized to provide stepper motor action because the activation of wires 72 causes the bent shaft 10 to rotate by a discrete amount. The wires 72 can be arranged radially from the bent shaft 10 which can result in a flatter package.

Figure 8:
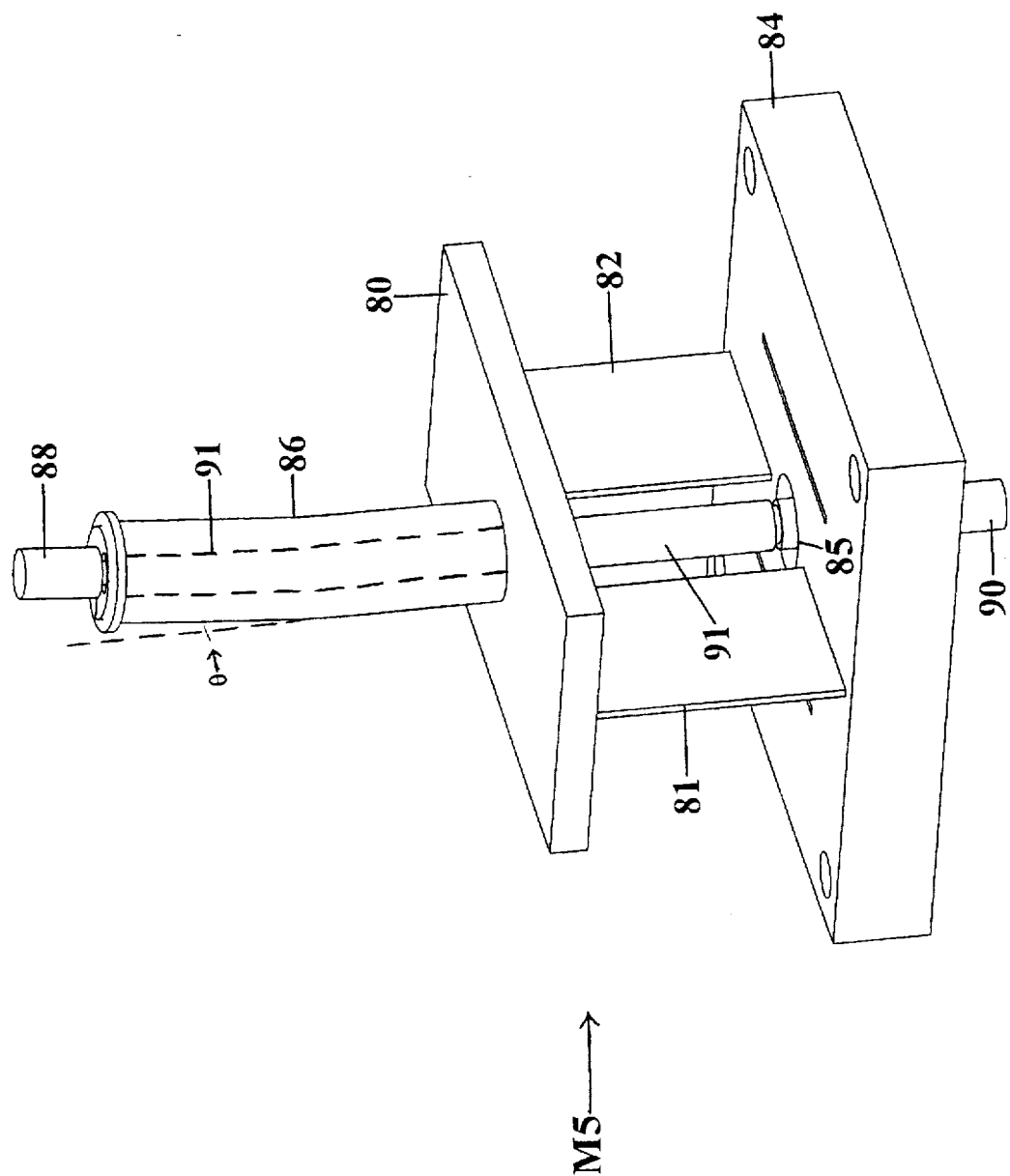
FIG. 8 shows a bent shaft resonant motor excited by benders.

FIG. 8 presents a further embodiment of the present invention in which a resonant motor M5 comprises a bent shaft 91 with an offset angle θ. The motor M5 is supported by a base 84 having a hole 85 therethrough. An output shaft 90 extends through hole 85 and is connected to bent shaft 91. A supporting platform 80 maintains piezoelectric benders 81 and 82 above base 84. Bent shaft 91 is positioned above platform 80. Shaft extremities 88 and 90 can be utilized to drive a given load. An applied voltage causes benders 81 and 82 to vibrate platform 80 to excite the resonant frequency of shell 86, and thereby drive bent shaft 91.

Figure 9:
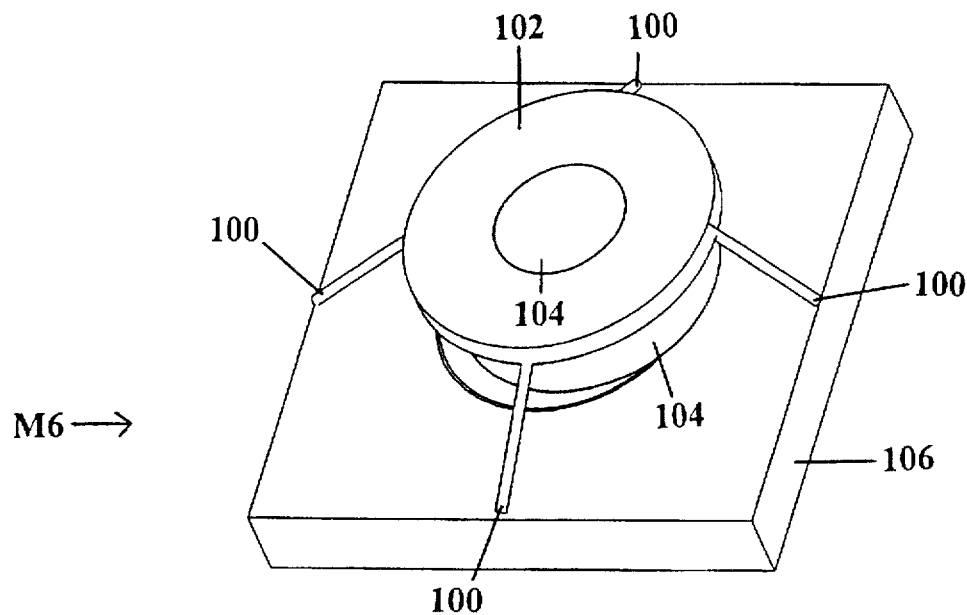
FIGS. 9a and 9b show two views of a bent shaft motor utilizing shaped memory alloy wires.
Figure 9:
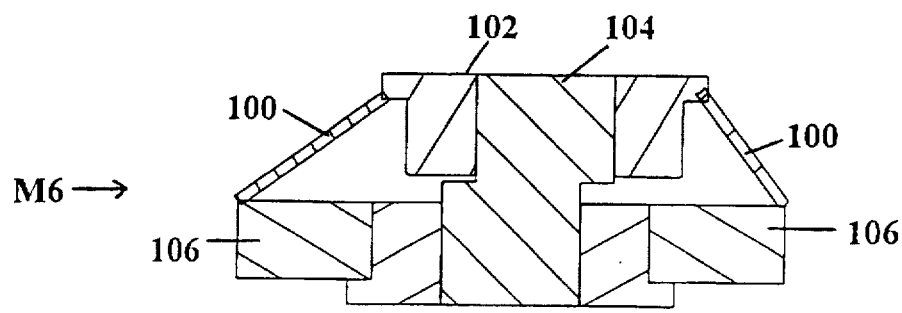

FIGS. 9(a) and 9(b) show a compact embodiment of the present invention. FIG. 9(a) is a three dimensional top view of resonant motor M6. FIG. 9(b) is a side view of motor M6. Motor M6 comprises wires 100 which cause the bent shaft 104 to rotate. Base 106 supports bent shaft 104 which is disposed within bearings 102 and 103. The wires 100 support bearing 102 and are also connected to base 106. The wires 100 can comprise shape-memory alloy material which responds to both direct heat and electrical activation. Applying heat in a prescribed sequence to wires 100 can cause the bent shaft 104 of motor M6 to rotate. Alternatively, each wire 100 can be electrically activated through resistive heating.

The particular values and configurations discussed herein can be varied and are cited merely to illustrate an embodiment of the present invention and are not intended to limit the scope of the invention. Other variations and modifications of the present invention will be apparent to those of ordinary skill in the art, and it is the intent of the appended claims that such variations and modifications be covered. It is contemplated that the use of the present invention can involve components having different characteristics as long as the principle, the presentation of a bent shaft motor according to the present invention, is followed.

What is claimed is:

1. A bent shaft motor, comprising:
    a base;
    a drive shaft which is rotable relative to said base wherein said drive shaft comprises a straight portion aligned with a main axis and an offset portion that is offset with respect to said main axis; and
    compliant drive means extending between said base and said offset portion of said drive shaft wherein sequentially flexing of said drive means drives said offset portion along a generally circular path in a plane perpendicular to the main axis to rotate said drive shaft.

2. The bent shaft motor of claim 1 wherein said drive means comprises a compliant structure surrounding said shaft.

3. The bent shaft motor of claim 2 wherein said straight portion further comprises an output shaft which has an axis of rotation and wherein said structure comprises a shell which precesses about the axis of rotation of the output shaft.

4. The bent shaft motor of claim 1 further comprising an exciter assembly.

5. The bent shaft motor of claim 4 wherein the exciter assembly is a piezoelectric assembly.

6. The bent shaft motor of claim 2 wherein the structure further comprises at least one or more benders wherein said benders surround the drive shaft.

7. The bent shaft motor of claim 6 wherein each bender is fixed to at least one flexible ring.

8. The bent shaft motor of claim 7 wherein said drive shaft has a contour and each bender is shaped to conform to the contour of the drive shaft.

9. The bent shaft motor of claim 8 wherein the benders comprise piezoelectric benders.

10. The bent shaft motor of claim 2 wherein the structure comprises shape memory alloy material which in the presence of heat will conform to a preferred shape.

11. The bent shaft motor of claim 10 wherein said structure conforms to the shape of the drive shaft.

12. The bent shaft motor of claim 11 wherein said motor is externally driven by selectively applying a heat source to the exterior of the structure to induce rotary motion in a clockwise or counter-clockwise direction.

13. The bent shaft motor of claim 2 wherein the structure further comprises at least one wire made of shape memory alloy material.

14. The bent shaft motor of claim 3 wherein said output shaft extends beyond said shell and said base.

15. The bent shaft motor of claim 1 wherein said base further comprises a passageway therethrough.

16. The bent shaft motor of claim 15 wherein said shaft extends beyond the shell through said passageway.

17. The bent shaft motor of claim 3 wherein the shell is cylindrically shaped.

18. The bent shaft motor of claim 1 wherein said drive shaft further comprises parallel but offset extremities.

19. The bent shaft motor of claim 1 wherein said drive shaft comprises a bent shaft.

* * * * *